May 17, 1966  M. E. HOMAN  3,252,097
MARGINAL CHECKING SYSTEM
Filed Oct. 29, 1962  3 Sheets-Sheet 1

INVENTOR
MERLE E. HOMAN

BY
ATTORNEY

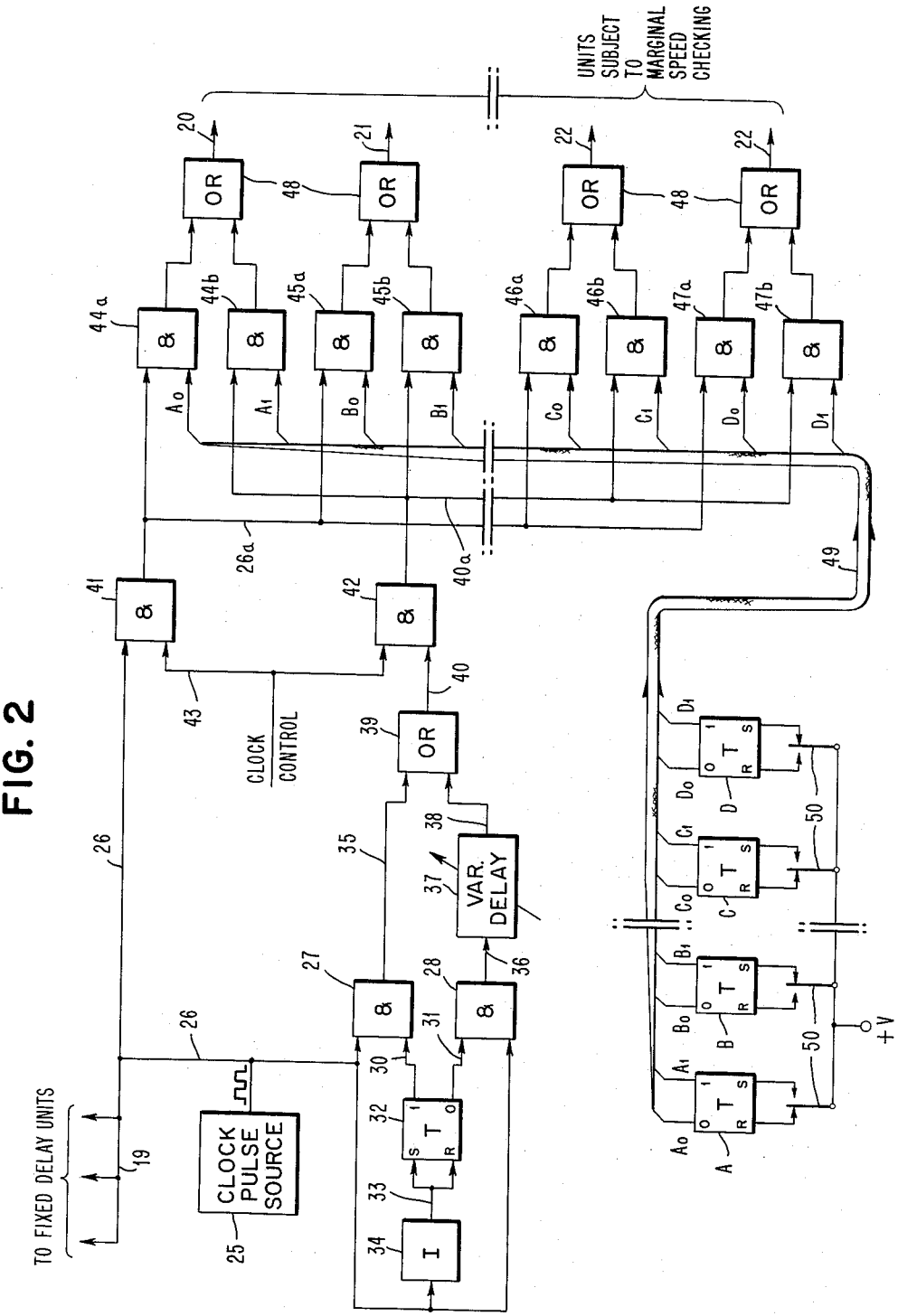

May 17, 1966   M. E. HOMAN   3,252,097
MARGINAL CHECKING SYSTEM
Filed Oct. 29, 1962   3 Sheets-Sheet 3

United States Patent Office 3,252,097
Patented May 17, 1966

3,252,097
MARGINAL CHECKING SYSTEM
Merle E. Homan, Poughkeepsie, N.Y., assignor to International Business Machines Corporation, New York, N.Y., a corporation of New York
Filed Oct. 29, 1962, Ser. No. 233,589
11 Claims. (Cl. 328—56)

The present invention relates generally to electronic data processing systems, and more particularly to means for checking the performance of such systems, and individual functional units therein, to insure trouble-free operation and to assist in location and correction of malfunctions.

Modern electronic data processing systems employ a multiplicity of electronic circuits that are operated in concert to perform complex data processing operations at high speeds. These various circuits must all operate effectively and in harmony to insure proper operation of the system. In designing the system, the operating characteristics of the individual component circuits are taken into account so that the various speeds of operation of the circuits, the delays in signal transmission, the noise levels which must be tolerated, etc. are provided for. Certain margins of safety are built into the system to account for minor variations in characteristic and in operation of the circuits that may be expected. So long as the circuits operate within these margins, satisfactory operation may be expected. If, however, deterioration of components or some other malfunction occurs in one or more circuits to alter the characteristics or operation thereof, the margins of safety in the system or part of it may be seriously reduced. While a change of characteristic may not itself cause erroneous operation, it may increase the likelihood of errors. Intermittent errors which are difficult to diagnose and correct are a consequence of marginal operation of the system.

It has long been recognized that a means for measuring the existing margins of safety of performance is an important tool maintaining a complex electronic data processing system. By measuring existing margins of safety, present performance may be compared with the design standards and impending malfunctions may be located and corrected. In addition, such a means is useful in solidifying intermittent errors to assist in diagnosis thereof.

Past marginal checking systems have usually employed means for varying voltage levels in the system. As designed, the system has limits (margins) within which voltage variations may occur without affecting the operation. If, however, malfunctions or component deteriorations exist, the tolerable variations may be significantly reduced, and the system may be operating at or near the extreme margin of safety. Cumulative effects of minor malfunctions may cause intermittent errors under such circumstances. By varying voltage levels in the system, or parts thereof, the existing limits of safe operation may be discovered and compared with the design limits. Intermittent errors are forced into solid errors by varying the voltage beyond existing margins of safety. The voltage variation form of marginal checking is, thus, an effective tool.

It has been found, however, that this form of marginal checking is not capable of completely analyzing performance. Speed effects are not accurately measured by voltage variations. In the case where circuit malfunction has altered some speed parameter, variation in voltage may not be relied upon to uncover the fault. Some means for marginal checking of speed effects is required.

In modern data processing systems operation of the various functional components and progress of information through the processing apparatus is controlled by clocking pulses which maintain harmony and synchronism throughout the system. While it might seem that marginal speed checking could be achieved merely by increasing or decreasing the repetition rate or frequency of these clocking pulses in a manner analogous to the voltage variation, it has been found that such an arrangement is not possible. In all data processing systems, there are certain functional units which have more or less fixed delays built into them and which are not susceptible to appreciable speed variation. These units must be omitted from any clock frequency variation checking scheme. In addition, the speed margins of certain functional parts of the system may vary from others so that any effective checking requires the application of different degress of variation in different parts of the system. This being the case, it is not sufficient or practical to merely increase or decrease the frequency of the clocking means for the system as a whole. It is likewise not sufficient or practical to attempt to merely increase or decrease the clock pulse frequency of only part of the system, since synchronism of the entire system must be maintained.

It is the object of this invention to provide a marginal checking system for an electronic data processing system which overcomes these difficulties in such a manner that synchronism is maintained throughout the system while at the same time selected portions of the system are subjected to variations in clock pulse frequency.

A further object of the invention is to provide means for performing marginal speed checking at will in any or all of certain selected portions of a data processing system without affecting the operation of the system as a whole.

Still another object of the invention is to provide means for activating and deactivating the marginal checking means at electronic speeds during operation of the system to aid in diagosing present or potential malfunctions.

It is also an object of this invention to provide a marginal speed checking system which is simple and economical, and which does not require substantial alteration of the system to which it is applied.

The present invention is applicable to data processing systems of the type wherein the operation of a plurality of functional component units are synchronized and controlled by a main clocking system which supplies timing and synchronizing pulses over a timing distribution system to the several units. These timing pulses are mixed in each of the units with command and control pulses provided in accordance with a program to enable the transmission of data between units and to enable the progression of data through various manipulating and processing stages within certain of the units. A data processing system of this type is described in the copending application, Serial No. 152,321, "Semi-Asynchronous Clock System" filed November 14, 1961, by S. H. Pitkowsky et al., assigned to the assignee hereof.

The objects of the invention are achieved by providing in the clocking system, a novel circuit for generating modified clock pulses which have the same average frequency or repetition rate as the normal clock pulses, but which are non-uniform in frequency of occurrence. In the disclosed embodiment, the modified clock pulses are shown as having alternate long and short cycles, one long cycle and one short cycle being equal to two normal cycles. When applied to a selected functional unit of the system, the modified clock pulses provide a marginal speed check by operating the tested unit in long cycles and short cycles, i.e., at decreased and increased speed. Since the modified pulses have the same average frequency as normal clock pulses, synchronism throughout the system is maintained. Means are provided for varying the increase and decrease in cycle time so that the limits of safe operation may be determined.

A switching network is provided for applying the modified clock pulses to individual portions of the system while the remainder is receiving normal clock pulses. The switching means is operable at electronic speeds to facilitate diagnostic operations.

The foregoing and other objects, features and advantages of the invention will be apparent from the following more particular description of preferred embodiments of the invention, as illustrated in the accompanying drawings.

In the drawings:

FIG. 2 is a block diagram of a clock system embodying the invention;

GENERAL DESCRIPTION

FIGURE 1

Figure 1:
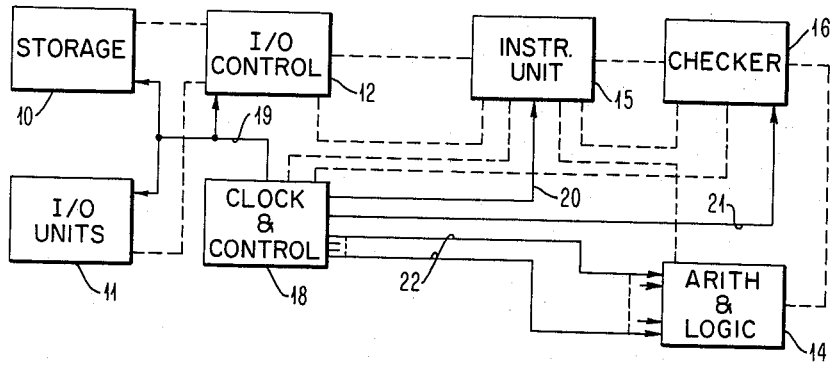
FIG. 1 is a schematic diagram of a data processing machine with which the present invention may be used.

The schematic diagram of FIG. 1 represents a typical data processing system of a type with which the present invention may be used. The system includes a storage unit 10 capable of receiving or supplying information at a high rate of speed. A plurality of input/output devices, generally indicated at 11, such as printers, punches, card readers, magnetic tape units are provided to supply raw data and to receive results. The storage and input/output units are coupled to an input/output control unit 12 which directs and controls transmission of information between these units and the rest of the data processing system. Processing of information is accomplished by arithmetic and logical circuits in the unit 14 under control of an instruction unit 15. The instruction unit interprets various instruction words supplied thereto in accordance with a program and controls the arithmetic and logic unit 14 and, through the input/output control 12, the storage 10 and input/output units 11 to carry out the program. A checking unit 16 is provided for monitoring operation of the arithmetic and logic units to determine whether the various instructions are carried out with accuracy.

Information paths between the several units just described are shown symbolically by the dotted connecting lines in FIG. 1. The lines entering or leaving the sides of blocks represent data paths and those entering or leaving the tops or bottoms of blocks represent control paths.

Operation of the several units of the system is co-ordinated by a clock and control unit 18. Timing distribution lines 19, 20, 21 and 22 are provided from the clock and control unit 18 to the several other units for this purpose. The several distribution lines carry regularly occurring clock pulses which are employed to time and synchronize transmission of information between units to insure harmonious operation and to control progress of information through various portions of each unit. These clock pulses are mixed in each unit with various command and control pulses that are generated as needed to direct the operations of the unit.

The details of the several units 10–16 are not necessary to an understanding of the present invention, so no detailed description of the units will be given herein. It is sufficient, for the purpose of this explanation to understand that each of the units is designed so that the operations it performs are accomplished at a rate controlled or synchronized by the pulses received from the clock unit 18. Certain of the units, for example, the storage unit 10, the input/output units 11, and their control unit 12 are more or less "fixed delay" units as far as the clock pulses are concerned. That is to say, these units employ the clock pulses mainly for synchronization and the internal timing and delay aspects thereof are independent of the clock. It is neither desirable nor practical to attempt to perform marginal speed checking in these units by variation of the clock pulse rate of unit 18. During marginal speed checking operations these units are to receive clock pulses at the normal rate. Accordingly, the pulse distribution system 19 is isolated from the marginal speed checking circuitry as will presently be described.

Others of the functional units of the system, for example, units 14, 15 and 16 employ the clock pulses for detailed timing and control. These units may use the pulses for such purposes as gating information to and from internal registers and through logic stages. These units are subject to marginal speed checking. In these units, however, the margins of safety in different areas may differ, and effects of increased or reduced delays in various areas may be self-cancelling in part. Accordingly, the timing distribution systems for the several units, and for different areas within them are kept separate, as shown symbollically by the several separate distribution systems 20, 21 and 22. As will presently appear, the present invention provides the capability of performing marginal speed checks in each of the units independently or in any selected combination. The distribution system 22 for the unit 14 is shown to include a plurality of lines to indicate that timing lines may be separated for areas within a unit to allow speed checking only in selected portions thereof. While the units 15 and 16 are shown as supplied with only timing one distribution line each, it will be apparent that many separate lines may be employed for each if desired.

DETAILED DESCRIPTION

Figure 3:
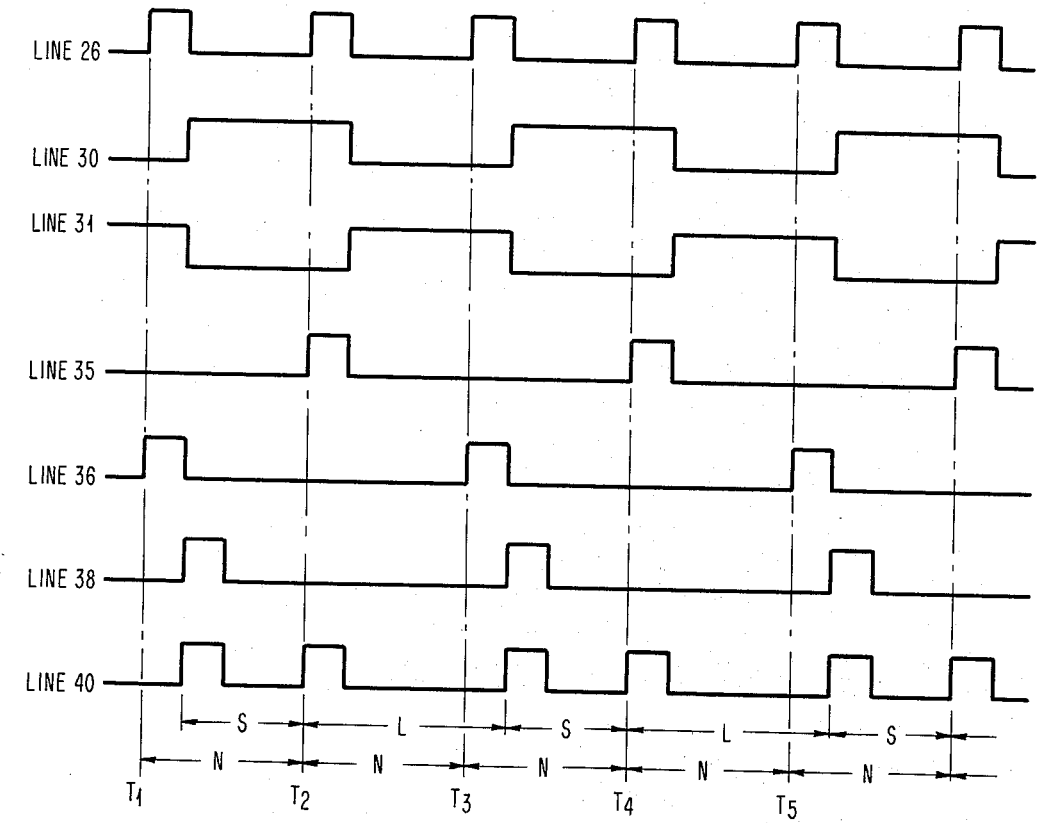
FIG. 3 is a pulse timing diagram illustrating the operation of the circuit of FIG. 3.

FIGURES 2 and 3

FIGURE 2 of the drawings illustrates the circuitry for providing marginal speed checking pulses to selected portions of the data processing system without disturbing the synchronism of the system as a whole. The circuit of FIG. 2 is not intended to represent the entire unit 18, but only that portion of it which relates to this invention.

As shown in FIG. 2, the clock and control unit 18 includes a clock pulse scource 25 adapted to emit, at uniform intervals, clock pulses having a predetermined amplitude and duration. The clock pulses supplied to line 26 are shown in the top line of the timing diagram of FIG. 3. The amplitude, duration and repetition interval N of the clock pulses are adjusted in accordance with the requirements of the system employed. Any suitable clock pulse source may be employed. The output of source 25 is applied via line 26 to the timing distribution system 19 of the units which are not to be marginally checked, and through control circuitry (to be described) to the timing distribution lines 20, 21 and 22, some of which are shown at the right of the drawing, for the units which are to be marginally checked.

The clock pulse source 25 also supplies pulses via line 26 to pulse modifying means provided in accordance with this invention. As shown in FIG. 2, a pair of AND circuits 27 and 28 are provided, each of which is responsive to concurrent application of signals of the same polarity (say, positive) at both of its inputs to supply an output signal of equal polarity. Circuits of this type are well-known in the art. One input for each of the AND circuits 27 and 28 is supplied by the line 26. The second inputs of the AND circuits 27 and 28 are supplied, respectively, by the true and complement outputs 30 and 31 of a binary connected trigger circuit 32. The trigger 32 responds to successive signals of a given polarity (say, positive) applied to its common input line 33 by flipping from one stable state to the other. For each of the two states, one output line supplies a positive output and the other does not. Binary connected triggers are well-known in the art, so no detailed explanation is considered necessary. The input line 33 for trigger 32 is supplied from an inverter circuit 34. As shown in FIG. 2, inverter 34 is supplied with clock pulses from line 26.

The effect of the circuit arrangement just described is to separate the clock pulses appearing on line 26 in such a manner that alternate pulses appear on the output line 35 of AND circuit 27, while the intermediate pulses appear on output line 36 of AND circuit 28. Reference to FIG. 3 will illustrate this operation. Consider that at time T1, trigger 32 is in that state where output line 31 is positive and line 30 is negative. Under these conditions, AND circuit 28 is conditioned to pass a clock pulse appearing on line 26 but AND circuit 27 is de-conditioned. The clock pulse appearing at time T1 is therefore applied to line 36. Upon termination of this clock pulse, inverter 34 supplies a positive signal to input line 33 for the binary connected trigger 32, flipping it to the opposite state so that line 30 is made positive and line 31 negative. The condition exists at time T2 when the next clock pulse appears. At time T2 AND circuit 27 is conditioned to pass the clock pulse but AND circuit 28 is de-conditioned. The second clock pulse appears on line 35. At the end of the second clock pulse, inverter 34 flips trigger 32 back again to pass the clock pulse appearing at time T3 to line 36. The trigger 32, as controlled by inverter 34, thus gates alternate clock pulses to one of the lines 35 or 36 and the intermediate pulses to the other.

Line 36 is applied to the input of a variable delay unit 37, which may be of any known type. The delay unit 37 is adjustable to delay the pulses applied for any predetermined period from zero to N (the interval between pulses supplied by clock 25). In FIG. 3, the delay unit is shown as delaying pulses for a period about equal to the duration of a pulse so that its output line 38 receives pulses staggered one pulse width from those on line 36.

Lines 35 and 38 are applied to a conventional OR circuit 39. The output line 40 of this circuit receives both the alternate clock pulses from line 35 and the alternate delayed clock pulses from line 39, as shown in the bottom line of FIG. 3. The pulse train on line 40 contains the same number of pulses as appear on line 26 but instead of being uniformly spaced, they appear in alternate short cycles S and long cycles L. Examination of FIG. 3 will shows that the modified pulse train on line 40 has the same average frequency as the pulse train on line 26 since one short cycle and one long cycle equal two normal cycles ($S+L=2N$). Moreover, alternate pulses of the train on line 40 are synchronized with alternate pulses of the train on line 26.

The modified clock pulse train on line 40 is available for performing marginal speed checking in any area of the system served by the clock means 18. Since this modified train appears simultaneously and in synchronism with the normal clock pulses it may be applied selectively to perform marginal checking in one or more subsections of the system without disturbing the remainder. The modified pulse train is subject to all of the same controls which may be provided for the normal clock pulses. These controls are shown symbolically by AND gates 41 and 42 conditioned by clock control line 43. The nature and purpose of the clock controls are not material to this invention and are not shown in detail. The copending application referred to earlier herein discloses one clock control system which may be incorporated.

Both the normal and modified clock pulses are supplied through a gating system to the various timing distribution lines 20–22 for the units of the data processing system that are subject to marginal speed checking. As illustrated at the right of FIG. 2 a plurality of pairs of AND gates 44a and 44b, 45a and 45b . . . 46a and 46b, 47a and 47b are provided for this purpose. The normal and modified clock pulse supply lines 26a and 40a, which extend from the outputs of the clock control gate 41 and 42, respectively, are applied to these gates. The normal clock pulse line 26a supplies each of gates 44a, 45a . . . 46a and 47a, while the modified clock pulse line 40a supplies gates 44b, 45b . . . 46b and 47b. Control means are provided for opening one or the other of the gates of each pair at a time to pass either the normal clock pulses or the modified clock pulses. The outputs of the gates of each pair are brought together through an OR circuit 48, the output of which feeds the associated timing distribution line 20, 21 or 22.

The control inputs for the gates of each pair are provided from the true complement outputs of one of a group of marginal checking control trigger A, B . . . C and D. These triggers are of the set-reset or non-complementing type, and respond to signals applied to separate set and reset inputs to switch to stable set or reset states. When in the set state each trigger A–D supplies a positive signal at its true output A1–D1 and when in the reset state is supplied a positive signal at its complement output A0–D0. A marginal checking control trigger is provided for each unit or area of the data processing system that is subject to separate checking. For example, trigger A may control checking in the instruction unit 15, or some part of it, trigger B, the checking unit 16 or some part of it and so on. The complement output of each different marginal checking control trigger is connected through cable 49 to the control input of one of the gates 44a–47a and the true output is connected through cable 49 to the control input of one of the gates 44b–47b. Thus the complement output A0 of trigger A controls gate 44a and the true output A1 controls gate 44b and so on. When marginal checking of a particular unit or portion of a unit is to be performed, the control trigger for that unit or portion is set. If no marginal checking is desired the control trigger is reset. For the sake of simplicity, a plurality of manual switches 50 are shown for setting and resetting the triggers A–D. It will be understood, of course, that any suitable means may be employed. For example, these triggers may be arranged to be set and reset by the data processing system itself under program control or, in the alternative, by manual control panel switches.

Figure 4:
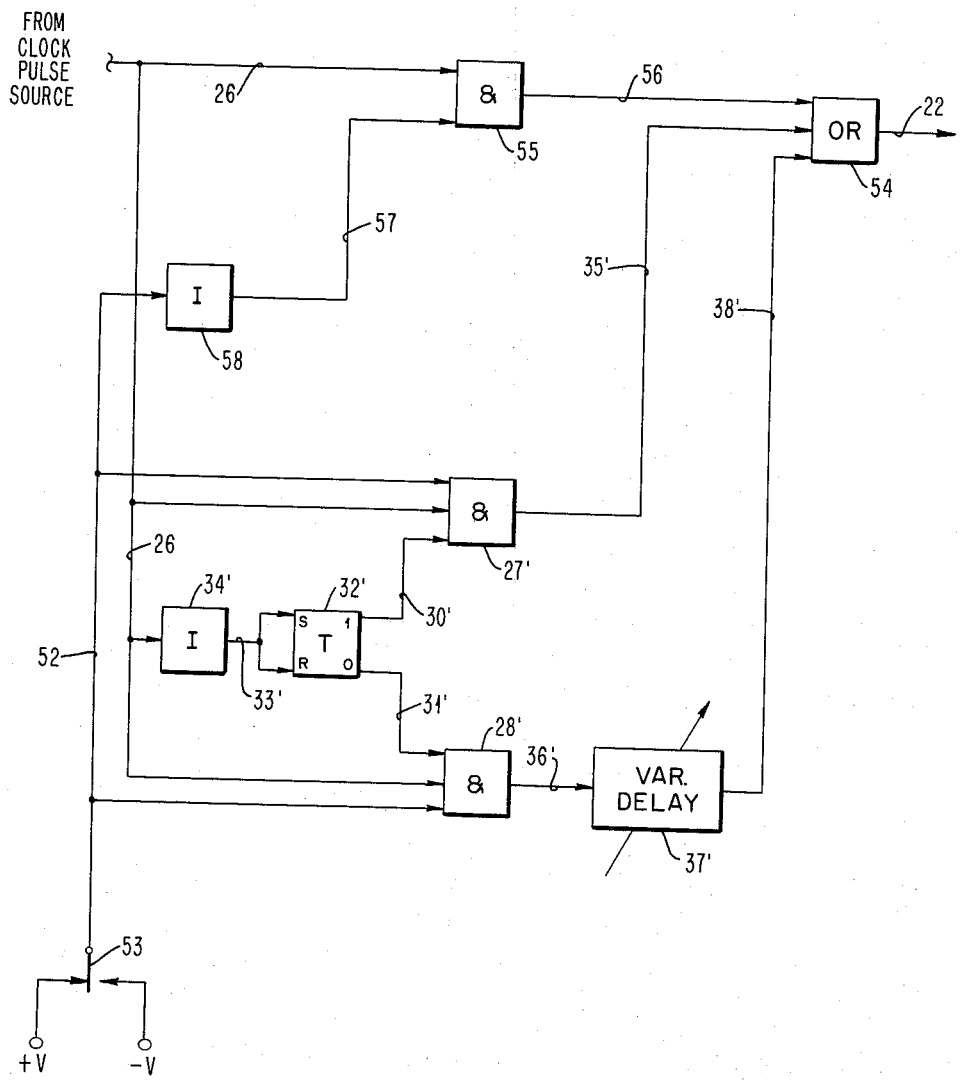
FIG. 4 is a block diagram of a modified form of the invention.

*Figure 4*

As an alternative to the switching arrangement shown in FIG. 2, a plurality of clock pulse modifying circuits may be provided, one for each timing distribution line supplying a unit or area to be checked. FIG. 4 illustrates an embodiment of one such circuit. This circuit is shown as receiving clock pulses via line 26 from a source such as the source 25 of FIG. 2 and transmitting either normal or modified pulses to a timing distribution line such as, for example, the line 22.

Examination of FIG. 4 will show that the same general arrangement for separating the clock pulses and delaying one train is employed. Accordingly, those elements which are similar to those employed in the circuit of FIG. 2 bear similar reference characters. The reference characters are primed (') to distinguish the elements of FIG. 4 from those of FIG. 2.

In this embodiment of the invention, the pulse separating trigger 32' feeds two AND circuits 27' and 28' each of which has three inputs that must be simultaneously supplied to provide outputs on the lines 35' and 36'. One input for each AND circuit 27' and 28' is supplied from the line 26. A second is supplied from one of the output lines 30' and 31' of trigger 32'. The third input for each AND circuit is supplied from a line 52. The line 52 is provided with switching means, shown symbolically at 53 to provide either a positive or a negative signal thereon. The means 53 may be a manual switch as shown, or some electronic device. As in the case of the switches 50 of FIG. 2, it may be subject to program control. When marginal speed checking is to be performed in the unit supplied by the line 22, switch 53 is operated to supply a positive signal to line 52, thus conditioning AND circuits 27' and 28' to pass signals. Line 35' then receives alternate clock signals and line 38' receives the intermediate signals delayed by unit 37'. These are combined through an OR circuit 54 which feeds line 22. When no marginal checking is desired, line 52 is held negative and AND circuits 27' and 28' are deconditioned so that no signals appear on line 35' and 38'.

When marginal checking is not being performed, normal clock pulses are supplied to line 22 from line 26. The means for accomplishing this includes an AND gate 55 which receives pulses from line 26 and passes them via a line 56 through OR circuit 54 to line 22. To insure that the normal pulses are not applied at the same time modified pulses are being transmitted, the gate 55 is provided with a control line 57 from an inverter 58. The inverter 58 is controlled from line 52. If line 52 is positive, to condition AND circuits 27' and 28', the inverter 58 provides a negative signal on line 57 to decondition gate 55 and block normal clock pulses. If, on the other hand, the line 52 is negative, blocking the modized clock pulses, inverter 58 applied a positive signal to line 57 to open gate 55 and pass the normal clock pulses to the timing distribution line 22.

It will be apparent that arrangement just described operates in the same general manner as the circuit of FIG. 2, to provide a similar result. Depending upon the machine being served and the particular clock arrangement included, either form of the invention may be employed. Those skilled in the art will appreciate that other switching arrangements including the invention, are also available.

SUMMARY

The advantages of the improved marginal speed checking system provided in accordance with this invention will be apparent to those skilled in the art. The modified clock pulses supplied on the line 40, when switched to a selected unit, subject the circuits of that unit to alternate increases and decreases in clock frequency while maintaining an average frequency which is the same as that of the normal clock pulses supplied to the system. Each circuit of the checked unit is operated alternately at an increased rate and a decreased rate so that both upper and lower margins of safety may be discovered. The variable delay unit 37 may be adjusted as desired to test the circuits for various speed differences, without adversely affecting the unchecked units. As will be apparent from the foregoing, all of these advantages are attained at the expense of only a few added components, and without necessitating any substantial alteration of the existing clock circuitry.

While the invention has been particularly shown and described with reference to preferred embodiments thereof, it will be understood by those skilled in the art that various changes in form and details may be made therein without departing from the spirit and scope of the invention.

What is claimed is:

1. In a data processing system which employs regularly occurring clock pulses for controlling and synchronizing operation of a plurality of functional units, means for performing marginal speed checking in less than all of said functional units without destroying synchronism of checked units and unchecked units comprising:
    means for generating a modified clock pulse train in which the intervals between some pulses are different from the intervals between other pulses, and in which the average interval between pulses is equal to the interval between said regularly occurring clock pulses,
    and means for applying said modified pulse train selectively to any unit of said data processing system concurrently with application of said normal clock pulses to other units of said system.

2. The invention defined in claim 1 wherein said means for generating a modified clock pulse train produces alternate pulses which occur simultaneously with alternate ones of said regularly occurring clock pulses.

3. In an electronic data processing system which includes a plurality of data handling and processing units operated in concert to perform a result and which includes a source of normal clock pulses and a plurality of distribution lines for applying said clock pulses to the several units to control and synchronize operation thereof, marginal speed checking means for applying modified clock pulses having modified characteristics to at least one of said units coincidently with the application of said normal clock pulses to at least one other unit of said system, said marginal speed checking means comprising:
    means responsive to said normal clock pulses for generating two pulse trains one of which includes clock pulses synchronized with alternate ones of said normal clock pulses and the other of which includes clock pulses synchronized with the remaining normal clock pulses;
    means for delaying one of said pulse trains a predetermined amount;
    means for combining said delayed pulse train with the other pulse train;
    and means for supplying the said combination of said delayed pulse train and the other pulse train to at least one unit of said system concurrently with application of said normal clock pulses to at least one other unit of said system.

4. In an electronic data processing system which includes a plurality of data handling and processing units operated in concert to perform a result and which includes a source of normal clock pulses and a plurality of distribution lines for applying said clock pulses to the several units to control and synchronize operation thereof, marginal speed checking means for applying modified clock pulses having modified characteristics to at least one of said units coincidently with the application of said normal clock pulses to at least one other unit of said system, said marginal speed checking means comprising:
    means for receiving said normal clock pulses and separating them into two pulse trains one of which includes alternate normal clock pulses and the other of which includes the remaining normal clock pulses;
    means for delaying one of said pulse trains a predetermined amount;
    means for combining said delayed pulse train with the other pulse train;
    and means for supplying the said combination of said delayed pulse train and the other pulse train to at least one unit of said system concurrently with application of said normal clock pulses to at least one other unit of said system.

5. In an electronic data processing system which includes a plurality of functional units, a source for supplying a first pulse train of regularly occurring clock pulses, and means for applying said regularly occurring clock pulses to said plurality of units to control and synchronize the operations thereof, means for performing marginal speed checking in selected ones of said units while maintaining synchronism of said selected ones of said units with the other units comprising:
    first and second gate means each receiving the first pulse train, each gate means having a separate output;
    means for opening the first gate means during occurrence of alternate clock pulses and for opening the second gate means during occurrence of the intermediate clock pulses so that alternate pulses are supplied to the output of the first gate means and the intermediate pulses are supplied to the output of said second gate means,
    means for delaying the pulses supplied to the output of said second gate means for a time different from the time interval between adjacent pulses of said first pulse train;

means for applying the pulses from the output of the first gate means and the delayed pulses to a common conductor and means for cutting off said regularly occurring clock pulses from selected units of said system and applying thereto pulses from said common conductor.

6. In an electronic data processing system which includes a plurality of functional units, a source for supplying a first pulse train of regularly occurring clock pulses, and means for applying said regularly occurring clock pulses to said plurality of units to control and synchronize the operations thereof, means for performing marginal speed checking in selected ones of said units while maintaining synchronism of said selected ones of said units with the other units comprising:

first and second gate means each receiving the first pulse train, each gate means having a separate output;

a bistable device having first and second output circuits the first of which is energized when said bistable device is in a first state and the second of which is energized when the bistable device is in the second state, each of said output circuits controlling one of said gate means;

means responsive to said first pulse train for changing the state of said bistable device following the occurence of each pulse, so that alternate pulses are supplied to the output of the first gate means and the intermediate pulses are supplied to the output of said second gate means;

means for delaying the pulses supplied to the output of said second gate means for a time different from the time interval between adjacent pulses of said first pulse train;

means for applying the pulses from the output of the first gate means and the delayed pulses to a common conductor and means for cutting off said regularly occurring clock pulses from selected units of said system and applying thereto pulses from said common conductor.

7. A circuit responsive to a first pulse train of regulraly occurring clock pulses for supplying a modified pulse train, alternate pulses of which are synchronized with alternate pulses of said first pulse train and intermediate pulses of which are out of synchronism with intermediate pulses of said first pulse train comprising:

means responsive to said first pulse train for generating two sub-trains the first of which includes pulses synchronized with alternate pulses of said first train and the second of which includes pulses synchronized with intermediate pulses of said first pulse train;

means for delaying the second sub-train for a time different from the time interval between adjacent pulses in said first pulse train; and means for combining said first sub-train and the delayed second sub-train to form a modified single pulse train.

8. A circuit responsive to a first pulse train of regularly occurring clock pulses for supplying a modified pulse train, alternate pulses of which are synchronized with alternate pulses of said first pulse train and intermediate pulses of which are out of synchronism with intermediate pulses of said first pulse train comprising:

means for separating said first pulse train into two sub-trains the first of which includes alternate pulses of said first train and the second of which includes intermediate pulses of said first pulse train;

means for delaying the second sub-train for a time different from the time interval between adjacent pulses in said first pulse train; and means for combining said first sub-train and the delayed second sub-train to form said modified pulse train.

9. In an electronic data processing system which includes an electronic circuit for processing information, a source of normal clock pulses and a distribution line for applying said clock pulses to said circuit to control operation thereof, means for selectively performing marginal speed checking in said circuit comprising:

means for receiving said normal clock pulses and separating them into two pulse trains one of which includes alternate normal clock pulses and the other of which includes the remaining normal clock pulses;

means for delaying one of said pulse trains a predetermined amount, means for combining said delayed pulse train with the other pulse train to form a modified clock pulse train;

and switching means selectively operable for disconnecting said normal clock pulse source from the distribution line and supplying the modified clock pulse train to said distribution line.

10. In a data processing system which employs regularly occurring clock pulses for controlling and synchronizing operation of a plurality of functional units, means for performing marginal speed checking in less than all of said functional units without destroying synchronism of checked units and unchecked units comprising:

means for generating a modified clock pulse train in which the intervals between some pulses are different from the intervals between other pulses, and in which the average interval between pulses is equal to the interval between said regularly occurring clock pulses;

and means for applying said modified pulse train to one unit of said data processing system concurrently with application of said normal clock pulses to another unit of said system.

11. The invention defined in claim 10 wherein said means for generating a modified clock pulse train produces alternate pulses which occur simultaneously with alternate ones of the regularly occurring clock pulses.

References Cited by the Examiner

UNITED STATES PATENTS

| 2,433,863 | 1/1948 | Oliver | 328—55 |
| 2,807,783 | 9/1957 | Vasseur | 332—11 |
| 2,942,190 | 6/1960 | Fischman | 328—67 |
| 3,051,902 | 8/1962 | Ross | 332—9 |
| 3,075,089 | 1/1963 | Maley | 328—55 |

OTHER REFERENCES

Hill: IBM Technical Disclosure Bulletin, vol. 1, No. 3, pp. 19–20, October 1958, International Business Machines Corp., New York, N.Y.

MALCOLM A. MORRISON, *Primary Examiner.*

ROBERT C. BAILEY, *Examiner.*

M. A. LERNER, M. P. ALLEN, *Assistant Examiners.*